United States Patent
Putt

[15] 3,678,490
[45] July 18, 1972

[54] MASTER CYLINDER LOW FLUID INDICATOR

[72] Inventor: James Basil Putt, South Bend, Ind.
[73] Assignee: The Bendix Corporation
[22] Filed: March 24, 1971
[21] Appl. No.: 127,686

[52] U.S. Cl. ............................340/244 E, 200/84 C, 340/59
[51] Int. Cl. ....................................G08b 21/00, B60t 17/22
[58] Field of Search ....................340/59, 244 E; 200/84 C; 188/1 A, 151 A

[56] References Cited
UNITED STATES PATENTS
3,577,121  5/1971  Wing et al.................................340/59

*Primary Examiner*—Thomas B. Habecker
*Attorney*—W. N. Antonis and Plante, Hartz, Smith & Thompson

[57] ABSTRACT

A fluid level warning device for indicating to the driver that an abnormally low supply of fluid is available in the master cylinder reservoir for actuating the brakes of a vehicle. The device includes a horizontally disposed reed switch which is located in the wall of the reservoir and a magnet secured to the reservoir diaphragm for actuating the switch.

3 Claims, 6 Drawing Figures

INVENTOR.
JAMES B. PUTT
BY
Plante, Hartz, Smith & Thompson
ATTORNEYS

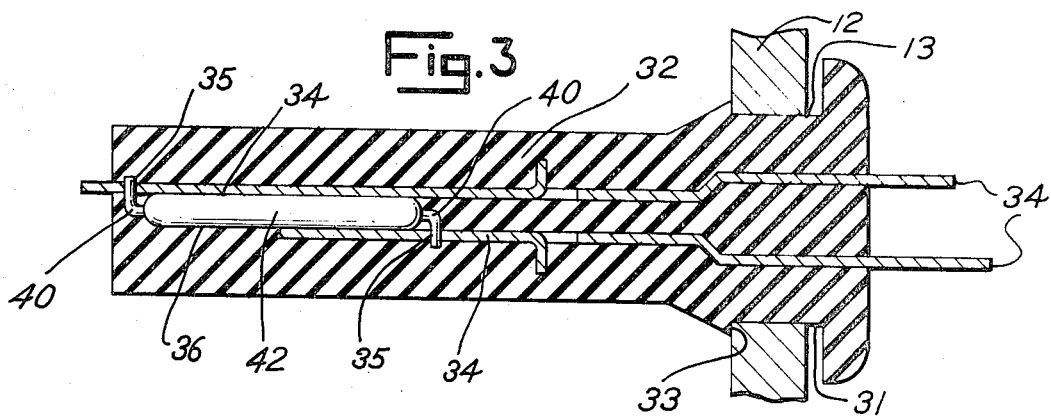
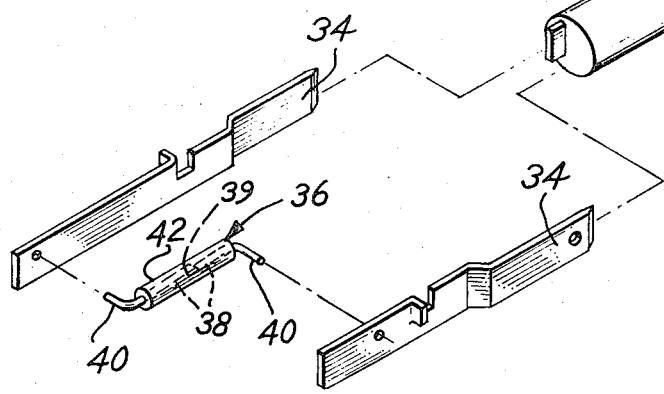
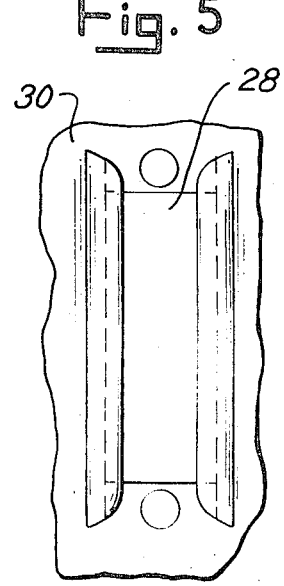
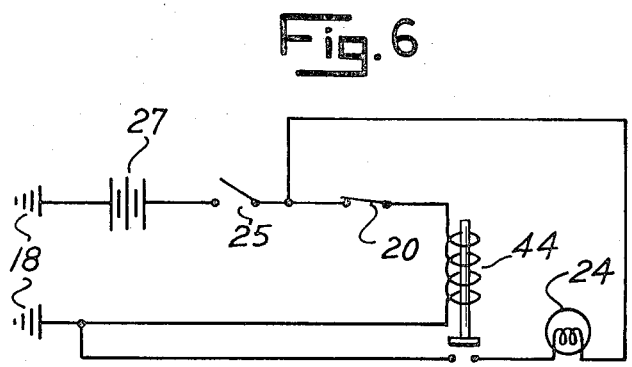

MASTER CYLINDER LOW FLUID INDICATOR

BACKGROUND OF THE INVENTION

This invention relates to hydraulic fluid level sensing devices for warning of a dangerously low fluid level in a master cylinder reservoir.

Most hydraulic fluid systems, including braking systems, require a reservoir for supplying hydraulic fluid to the systems and replenishing losses in the systems.

The components of braking systems, as a rule, very carefully constructed to be as nearly leak-proof as possible. However, experience has shown that small leaks, especially past the piston in the master cylinder, can take place, and the fluid in the system will gradually be dissipated. In such systems, it has been the usual practice of service station operators and mechanics, who recognize this problem, to usually check the level of the brake fluid in the master cylinder reservoir upon each servicing operation whereby the level conditions are usually observed in time to remedy the same.

In addition to the gradual loss of fluid that nearly always takes place, it sometimes happens that the conduits or connections through which the brake fluid is transferred from the master cylinder to the brake operating mechanism spring a leak, in which case the fluid disappears quite rapidly and unless some means is provided to apprise the driver of the fact that there is a shortage of brake fluid, he may discover this only when he tries to apply the brakes and finds that they do not respond. Because of the foregoing, the Federal Motor Vehicle Safety Standards require the use of a master cylinder reservoir level indicator light as a warning of a possible malfunction in the braking system.

Many of the prior art fluid level indicating devices have utilized floating magnets which, as the fluid level in the master cylinder reservoir decreased, moved a reed switch and actuated same. Since such magnets are difficult to machine, such prior art switches are very expensive to make. For example, in many of these devices the magnet was in the form of a ring or other complex shape which required extensive machining of the brittle, hard substance (Alnico, etc.) from which reliable permanent magnets are fabricated. Also, most previous configurations of such sensing devices have been vertically disposed so that mounting had to be accomplished through the lid of the master cylinder reservoir. Such vertical mounting necessitated either removing the sensing device with the cover of the reservoir during servicing operations which is undesirable since the device could be damaged, or providing an opening in the cover to permit separate removal thereof, which opening likewise is undesirable since it could provide an additional leakage and contamination path.

Additionally, most prior warning switch devices have required that the magnets with a float attached thereto either surround the vertically disposed reed switch or else be positioned closely thereto to move vertically with the hydraulic fluid level inside the fluid reservoir. This creates a moving part relationship, not observable from outside the assembly, which is subject to malfunction because of the possibility that the floating magnet will stick and thereby fail to warn the vehicle operator of a low hydraulic fluid condition.

SUMMARY OF THE INVENTION

It is a primary object of this invention to provide a low fluid level warning switch which is simply mounted without necessity for complex assembly procedures and/or processes.

Another object of this invention is to provide a low fluid level warning switch which is horizontally mounted through the side of a master cylinder reservoir thereby eliminating the necessity for a clearance hole through the reservoir cover or permanent mounting of the switch to the cover as is the case with vertical switch mountings.

A further object of this invention is to provide a low fluid level reed switch which utilizes a magnet to actuate same, the general shape and dimension of which are not critical, thereby greatly reducing manufacturing costs.

Still another object of this invention is to provide a reed switch, the magnetic operating element of which is disposed above the liquid level of the reservoir thereby diminishing chances of malfunction of the switch.

DESCRIPTION OF THE DRAWINGS

FIG. 3 is a sectional view of the reed switch probe assembly taken along line 3—3 of FIG. 2.

FIG. 4 is an exploded view of the reed switch probe assembly illustrating the components of the assembly.

FIG. 5 is a plan view illustrating a method of securing the magnet to the master cylinder diaphragm.

FIG. 6 illustrates schematically, typical electrical circuitry which might be employed for utilization of the normally closed reed switch configuration.

DESCRIPTION OF THE PREFERRED EMBODIMENT

Figure 1:
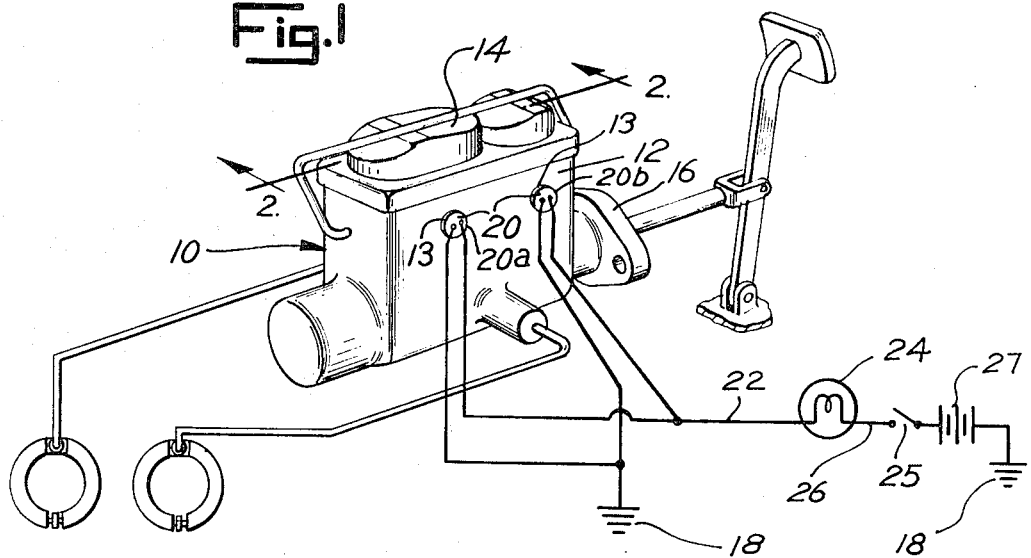
FIG. 1 is an isometric assembly view of a master cylinder including my low fluid level indicator and its associated electrical circuitry.

Referring now to FIG. 1, there is shown a master cylinder 10 having a split fluid reservoir 12 having portions 12a and 12b closed by a cover 14. A flange 16 provides a means for attaching the master cylinder to a motor vehicle. Electrical ground 18 is represented schematically and could be any place on the vehicle having a ground potential. Portions 12a and 12b of the reservoir 12 are provided with reed switches 20a and 20b respectively for indicating the level of hydraulic fluid 19a and 19b in the respective portions. The switches are connected by a lead wire 22 to a bulb 24 which is visible to the driver of the vehicle. The reed switches 20a and 20b are economically and easily mounted in the hydraulic fluid reservoir portions 12a and 12b by simply pressing them into preformed holes 13 in the side of the reservoir wall. Another electrical lead 26 connects the bulb 24 to the vehicle ignition switch 25 and to the vehicle battery 27. Two magnets 28a and 28b are secured to reservoir diaphragm 30 for actuation of reed switches 20a and 20b, respectively.

Figure 2:
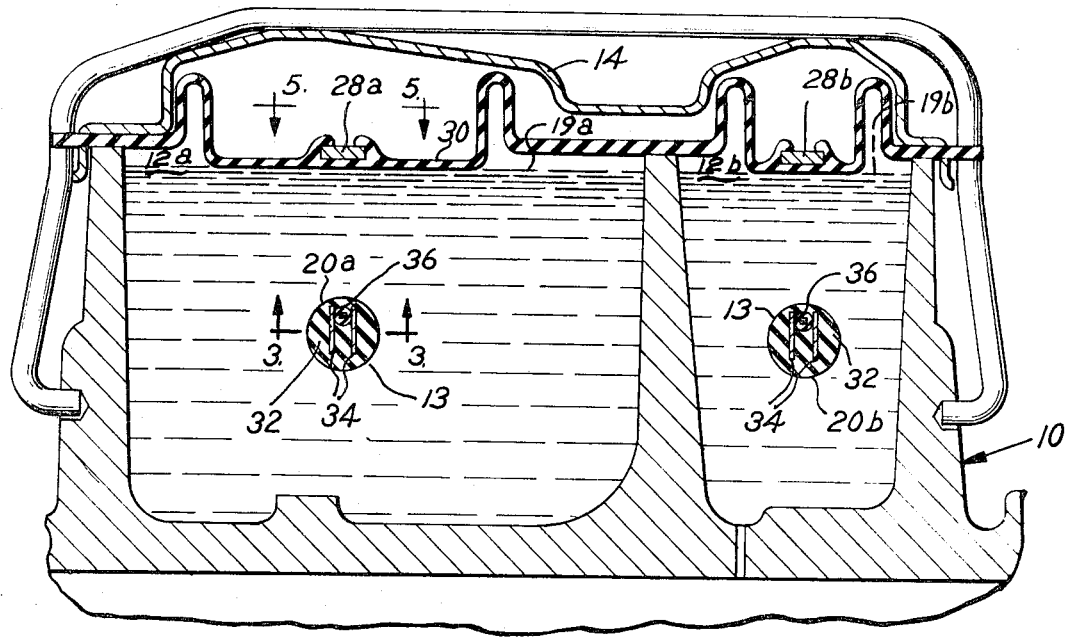
FIG. 2 is a sectional view of my low fluid level indicator taken along line 2—2 of FIG. 1.

With reference now to FIGS. 2 and 3, each of the reed switches 20a and 20b are shown to comprise a rubber-like electrically insulative probe 32 which is molded around electrically conductive terminal strips 34 and reed switch capsule 36. The probe 32 has a shoulder 33 and a groove 31 which respectively position and retain the reed switch mounted in the wall of the master cylinder. Capsule 36 contains spring contacts 38 which are separated by an air gap (in the normally open configuration) at overlapping ends 39 and are formed from a magnetic material. Capsule leads 40 connect the reed switch at either end to one of the terminal strips 34 and 35 by soldering or other suitable attachment process. The capsule envelope 42 should be leakproof and fabricated of a non-magnetic material (i.e., be magnetically transparent) so as not to affect the function of the reed switch by inducing spurious magnetic forces which would operate against the spring contacts 38. In the normally closed configuration of the reed switch capsule 36, spring contacts 38 would normally be disposed together at the overlapping ends 39 for completing an electrical circuit through the reed switch capsule 36. Appropriate circuitry would be connected to it for detecting interruption of the circuit whenever the fluid level 19 was low as for example by utilizing a normally closed relay 44 as illustrated in FIG. 6.

MODE OF OPERATION OF THE PREFERRED EMBODIMENT

So long as the hydraulic fluid level 19a or 19b remains satisfactory (i.e., sufficiently full that no danger of exhaustion of the supply during a brake application exists) diaphragm 30 and magnets 28a and 28b attached thereto will be positioned far enough away from reed switches 20a and 20b that repositioning of the spring contacts inside the reed switch capsules 36 will not occur.

Should the fluid level in either of the master cylinder reservoir portions 12a or 12b be depleted through slow leakage past individual wheel cylinder piston seals, the master cylinder piston seal or fitting leaks etc., or by a rupture in either hydraulic system, diaphragm 30 will be pulled downward into the portion 12a or 12b by the vacuum created because of the increase in volume below the diaphragm as a consequence of the loss of fluid (i.e., atmospheric pressure will push the diaphragm downward to relieve the vacuum created by the hydraulic fluid loss). In so doing, the diaphragm will move either magnet 28a or 28b toward its associated reed switch 26a or 26b. When sufficiently near its associated reed switch, the magnetic field created by the diaphragm magnet overcomes the flexural rigidity of spring contacts 38 and, in the normally open configuration, causes the spring contacts 38 to close thereby connecting the circuit from battery 27 through bulb 24 to ground 18. This causes bulb 24 to light thus warning the driver of the fact that there is a shortage of brake fluid.

In the normally closed configuration, the effect of the magnetic field on the contacts would be just the opposite, that is, as the diaphragm and attached magnet approach the associated reed switch, spring contacts 38 of the reed switch capsule 36 are forced apart in response to the force of the magnetic field of magnet. This circuit interruption would be sensed by appropriate circuitry such as shown in FIG. 6. Such a circuit can contain a transducer with appurtenant firing circuitry or the "hold-in" coil of a normally closed relay 44 in the same branch as the reed switch 20 while having the indicator 24 in the separate branch circuit connected to the terminals of the relay 44, as depicted in FIG. 6.

I claim:

1. In a master cylinder:
   a wall defining fluid reservoir means therewithin;
   a cover member for closing said reservoir means;
   diaphragm means operatively connected between said wall and said cover member and adapted to follow the fluid level in said reservoir means;
   magnetically operated switch means located in said wall, said switch means having a pair of contacts movable from a non-actuated position to an actuated position;
   signal means for indicating a predetermined fluid level in said reservoir means;
   electrical circuit means operatively connecting said signal means with said switch means; and
   magnetic means fixedly connected to said diaphragm means for actuating said switch means when said diaphragm means moves near said switch means, said switch means being actuated upon movement of said pair of contacts from said non-actuated position to said actuated position.

2. The invention of claim 1 wherein said switch means comprises:
   a hermetic non-conductive tube having a pair of magnetic contact elements extending longitudinally inwardly from the respective ends of said tube with normally resiliently spaced overlapping end portions adapted to be drawn into said actuated position by said magnetic means;
   electrical lead means connected to the respective outer ends of said magnetic contact elements and extending through said tube at either end;
   a terminal blade attached to the outer end of each of said electrical leads and disposed parallel with said tube therebetween for completing an electrical circuit to the exterior end of said switching means and for providing external connection of said electric circuit means to said switching means; and
   a resilient body within which said tube, a portion of said leads and a portion of said terminal blades are encapsulated.

3. The invention of claim 1 wherein:
   said switch means comprises a hermetic non-conductive tube having a pair of magnetic contact elements extending longitudinally inwardly from the respective ends of said tube with normally resilient contacting overlapping end portions adapted to be drawn apart by said magnetic means such that said signal means is actuated;
   electrical lead means connected to the respective outer ends of said magnetic contact elements and extending through said tube at either end;
   a terminal blade attached to the outer end of each of said electrical leads and disposed parallel with said tube therebetween for completing an electrical circuit to the exterior end of said switching means and for providing external connection of said electrical circuit means to said switching means; and
   a resilient body within which said tube, a portion of said leads and a portion of said terminal blades are encapsulated.

* * * * *